US008819550B2

(12) United States Patent
Evans et al.

(10) Patent No.: US 8,819,550 B2
(45) Date of Patent: Aug. 26, 2014

(54) ON-BOARD VEHICLE COMPUTER SYSTEM

(75) Inventors: David K. Evans, Los Altos Hills, CA (US); Vishakha Radia, Rochester Hills, MI (US); Michael A Caponigro, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1084 days.

(21) Appl. No.: 11/947,175

(22) Filed: Nov. 29, 2007

(65) Prior Publication Data

US 2009/0144622 A1 Jun. 4, 2009

(51) Int. Cl.
*G06F 3/00* (2006.01)

(52) U.S. Cl.
USPC ............... 715/708; 715/706; 701/1; 701/537; 701/538; 235/492

(58) Field of Classification Search
CPC ............ G06F 3/0482; G06F 17/30716; G08G 1/096838; G08G 1/096872
USPC ........................................................ 715/708
See application file for complete search history.

(56) References Cited

U.S. PATENT DOCUMENTS

| 6,505,780 | B1 * | 1/2003 | Yassin et al. | 235/492 |
| 6,708,086 | B2 * | 3/2004 | Richard | 701/1 |
| 2007/0102875 | A1 * | 5/2007 | Maierhofer et al. | 271/302 |
| 2007/0171029 | A1 * | 7/2007 | Inbarajan | 340/425.5 |
| 2008/0319653 | A1 * | 12/2008 | Moshfeghi | 701/208 |
| 2009/0032665 | A1 * | 2/2009 | Smith et al. | 248/343 |
| 2009/0055187 | A1 * | 2/2009 | Leventhal et al. | 704/260 |

OTHER PUBLICATIONS

Sync: Voice-activated mobile phone and digital music system for your car; http://syncmyride.com/#/home/; 1 page, Printed, Nov. 27, 2007.
Windows Embedded: Embedded devices, technology & embedded development; http://www.microsoft.com/windows/embedded/default.mspx; 2 pages, Printed Nov. 27, 2007.
Garmin. We'll Take You There; http://www.garmin.com/garmin/cms/site/us; 1 page, Printed Nov. 27, 2007.
OnStar by GM/OnStar.com, Car Safety Device and Vehicle Security System; http://www.onstar.com/us_english/jsp/index.jsp; 2 pages, Printed Nov. 27, 2007.

* cited by examiner

*Primary Examiner* — Amy Ng
*Assistant Examiner* — Andres E Gutierrez
(74) *Attorney, Agent, or Firm* — Baker Botts L.L.P.

(57) ABSTRACT

In one embodiment, an apparatus includes a touch-screen display. The apparatus includes first logic for generating a virtual assistant for presentation to a user via the touch-screen display. The virtual assistant has one or more anthropomorphic characteristics and interacts with the user via at least the touch-screen display to facilitate user access to one or more vehicle features. The apparatus includes second logic for automatically receiving data from a radio-frequency identification (RFID) tag in a personal item of the user to identify the user, automatically accessing a profile associated with the RFID tag, and automatically initiating implementation of one or more of preferences of the user indicated by a profile associated with the RFID tag. The apparatus includes a vehicle interface for coupling the apparatus to any one of multiple vehicles and communicating data between the first or second logic and the vehicle.

22 Claims, 12 Drawing Sheets

ON-BOARD VEHICLE COMPUTER SYSTEM

TECHNICAL FIELD

The present disclosure relates generally to computer systems for vehicles.

BACKGROUND

Vehicles generally include features such as audio systems, climate control systems, navigation systems, and other vehicle features. Many vehicle features are independent of each other. For example, vehicles typically have one set of controls for the climate control system and a separate set of controls for the audio system.

DESCRIPTION OF EXAMPLE EMBODIMENTS

Overview

In one embodiment, an apparatus includes a touch-screen display. The apparatus includes first logic for generating a virtual assistant for presentation to a user via the touch-screen display. The virtual assistant has one or more anthropomorphic characteristics and interacts with the user via at least the touch-screen display to facilitate user access to one or more vehicle features. The apparatus includes second logic for automatically receiving data from a radio-frequency identification (RFID) tag in a personal item of the user to identify the user, automatically accessing a profile associated with the RFID tag, and automatically initiating implementation of one or more of preferences of the user indicated by a profile associated with the RFID tag. The apparatus includes third logic for receiving input from the user indicating one or more preferences of the user for one or more vehicle settings and, in response to the input, initiating implementation of one or more of the preference indicated by the user and receiving input from the user requesting access to one or more desired vehicle features and, in response to the input, providing the user access to one or more of the one or more desired vehicle features via at least the touch-screen display. The apparatus includes a vehicle interface for coupling the apparatus to any one of multiple vehicles and communicating data between the first, second, or third logic and the vehicle. The touch-screen display and one or more of the first, second, or third logic collectively interact with the user independent of whether the vehicle interface is coupled to one of the plurality of vehicles.

Description

Figure 1:
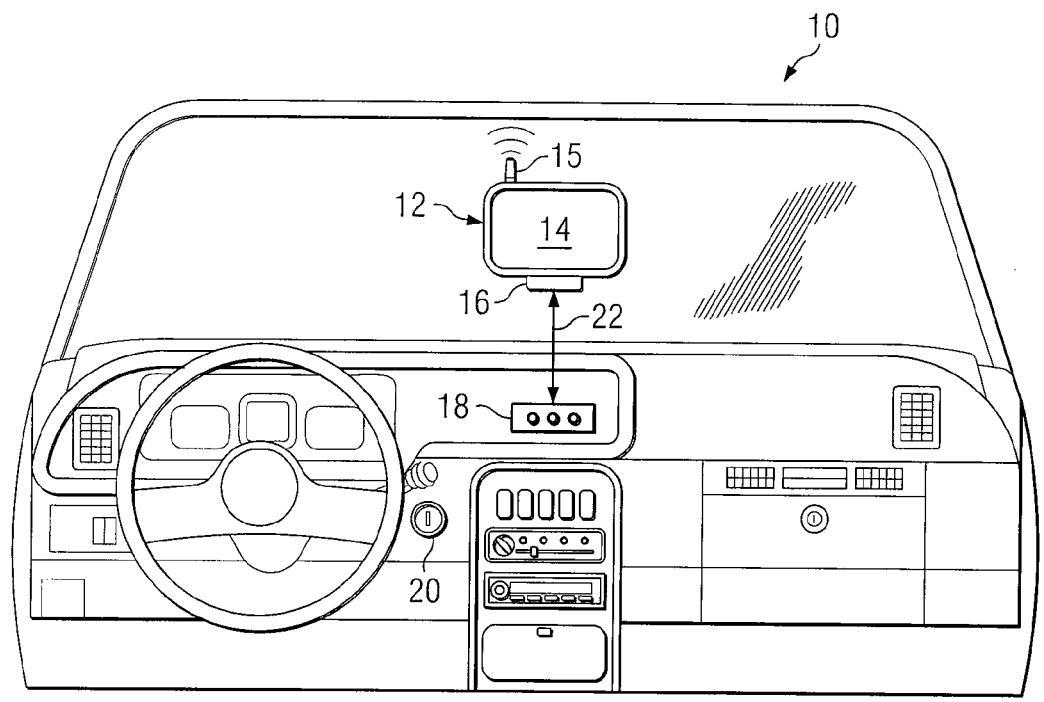
FIG. 1 illustrates an example vehicle interior with an example on-board vehicle computer system.

FIG. 1 illustrates an example vehicle interior 10 with an example on-board vehicle computer system 12. In particular embodiments, the vehicle may include a car assembled or manufactured at least in part by FORD or TOYOTA, as examples. In particular embodiments, on-board vehicle computer system 12 configures and displays vehicle features on a display 14. On-board vehicle computer system 12 includes a wireless interface 15 to communicate with wireless networks and a vehicle interface 16 to communicate with the vehicle through a port 18. As described in more detail below, on-board vehicle computer system 12 communicates with a radio-frequency identification (RFID) reader 20 to configure and display RFID system settings.

On-board vehicle computer system 12 configures and displays vehicle features according to vehicle feature data. Vehicle features may include audio systems, climate control systems, navigation systems, RFID systems, navigation system, a multimedia owner manual for the vehicle, or a vehicle status feature, as examples. In particular embodiments, the vehicle and on-board vehicle computer system 12 may collectively provide the vehicle features. Vehicle feature data may include any suitable data to configure and display vehicle features on display 14.

In particular embodiments, on-board vehicle computer system 12 may receive raw data in different data formats from each of the different vehicle features. For example, on-board vehicle computer system 12 may receive raw data in a first data format from the climate control system. On-board vehicle computer system 12 may generate vehicle feature data for display on display 14 based on the raw data received from the climate control system. As another example, on-board vehicle computer system 12 may receive raw data in a second data format from the audio system. On-board vehicle computer system 12 may generate vehicle feature data for display on display 14 based on the raw data received from the audio system.

In particular embodiments, on-board vehicle computer system 12 may receive input through display 14 to configure each of the different vehicle features. For example, on-board vehicle computer system 12 may receive input from a user to configure the climate control system. On-board vehicle computer system 12 may implement the desired vehicle settings by generating vehicle feature data to transmit to the climate control system. As another example, on-board vehicle computer system 12 may receive input from a user to configure the audio system. On-board vehicle computer system 12 may implement the desired vehicle settings by generating vehicle feature data to transmit to the audio system.

In particular embodiments, vehicle feature data may include one or more vehicle settings. For example, the one or more vehicle settings may include climate control settings, audio settings, ergonomic settings, and any other future settings such as vehicle color settings. In particular embodiments, vehicle feature data may include one or more RFID system settings. For example, on-board vehicle computer system 12 may configure and display one or more RFID system settings associated with one or more RFID tags. In particular embodiments, vehicle feature data may include a virtual assistant that provides additional vehicle feature data. For example, a virtual assistant may have one or more anthropomorphic characteristics and may interact with a user via at least display 14 to provide information and facilitate user access to one or more vehicle features.

Display 14 displays and receives input to configure vehicle features. For example, display 14 may include a graphical user interface (GUI). In the example, display 14 may include an input device such as a touch-screen. The touch-screen may include one or more touch-screen icons that are associated with one or more vehicle features. A user may select a particular touch-screen icon to display and configure the vehicle feature associated with the particular touch-screen icon. As an example, the user may select a touch-screen icon associated with the climate control system, display 14 may display the climate control settings, and the user may configure the climate control settings through the touch-screen. However, the present disclosure contemplates many different ways to configure and display vehicle features. For example, on-board vehicle computer system 12 may include other input devices such as a voice-activated interface, keyboard, mouse, graphics tablet, joystick, light pen, microphone, scanner, or a combination of two or more such input devices.

Wireless interface 15 communicates with wireless networks, such as a wireless local area network (WLAN) or a wireless wide area network (WWAN). For example, wireless interface 15 may include an antenna and transceiver to communicate with any, appropriate type of WLAN (such as a WLAN based on the Institute of Electrical and Electronics Engineers (IEEE) 802.11 standard) or any appropriate wireless stand-alone devices (such as Bluetooth-enabled devices). As another example, wireless interface 15 may include an antenna and transceiver to communicate with any appropriate global positioning system (GPS). Wireless interface 15 may communicate with on-board vehicle computer system 12 to display information to a user.

Vehicle interface 16 communicates with the vehicle. For example, vehicle interface 16 may receive input for on-board vehicle computer system 12, transmit output from on-board vehicle computer system 12, perform suitable processing of the input or output or both, communicate with other devices, or any combination of the preceding. Vehicle interface 16 may include appropriate hardware (e.g., a modem, network interface card, etc.) and software, including protocol conversion and data processing capabilities, to communicate through a local area network (LAN), wide area network (WAN), or other communication system that allows on-board vehicle computer system 12 to communicate with the vehicle and other devices. Vehicle interface 16 may include one or more ports, conversion software, or a combination of any of the preceding.

Port 18 facilitates communication of vehicle feature data between vehicle interface 16 and the vehicle. For example, port 18 may connect to a data bus that connects to vehicle features such as the audio system, climate control system, and navigation system. As another example, port 18 may connect to a diagnostic link connector (DLC). The DLC may connect to an on-board diagnostic (OBD) system that provides vehicle diagnostic information. However, one of ordinary skill in the art will recognize that the present disclosure may include any suitable vehicle diagnostic device/status information protocols, including future protocols, without departing from the scope and spirit of the present disclosure.

RFID reader 20 communicates with one or more RFID tags. For example, RFID reader 20 may communicate with an RFID tag in a personal item of the user. For example, a vehicle key may include an RFID tag. As another example, a key fob may include an RFID tag. RFID reader 20 communicates with the RFID tag to identify the user and determine one or more RFID system settings associated with the user. In particular embodiments, the RFID system settings may include user rules such as a vehicle speed limit, an audio volume limit, and a geographic area limit. For example, the geographic area limit may include a rule to notify a third party if the user leaves a certain geographic area. In particular embodiments, if the user violates one or more of the rules, on-board vehicle computer system 12 may generate one or more notifications to one or more predetermined addresses. For example, the notifications to predetermined addresses may include a text message to a predetermined telephone number or an e-mail to a predetermined e-mail address. In particular embodiments, on-board vehicle computer system 12 may require a password to modify the rules. In FIG. 1, RFID reader 20 is located on the dashboard of the vehicle. In particular embodiments, RFID reader 20 may be located in any other suitable location.

In particular embodiments, on-board computer system 12 may automatically access and implement the RFID settings associated with the user. For example, on-board computer system 12 may automatically access a profile associated with the RFID tag. In particular embodiments, the profile may include one or more preferences of the user for one or more vehicle settings. In particular embodiments, the profile may include one or more user rules as described above. On-board computer system 12 may automatically initiate implementation of one or more of the preferences of the user.

In particular embodiments, a user may disconnect on-board vehicle computer system 12 from the vehicle, as indicated by arrows 22. For example, on-board vehicle computer system 12 may be a portable device. A user may remove on-board vehicle computer system 12 from one vehicle and may connect on-board vehicle computer system 12 to any of a number of vehicles. The user may interact with on-board vehicle computer system 12 independent of whether vehicle interface 16 is connected to one of the vehicles. For example, as described in more detail below, on-board vehicle computer system 12 may display vehicle features when outside the vehicle (e.g., a demonstration of how to fix a flat tire).

Modifications, additions, or omissions may be made to on-board vehicle computer system 12 without departing from the scope of the disclosure. The components of on-board vehicle computer system 12 may be integrated or separated. Moreover, the operations of on-board vehicle computer system 12 may be performed by more, fewer, or other components. For example, the operations of display 14 may be performed by more than one component. Additionally, operations of on-board vehicle computer system 12 may be performed using any suitable software, hardware, or embedded logic component or any combination of two or more such components.

Figure 2:
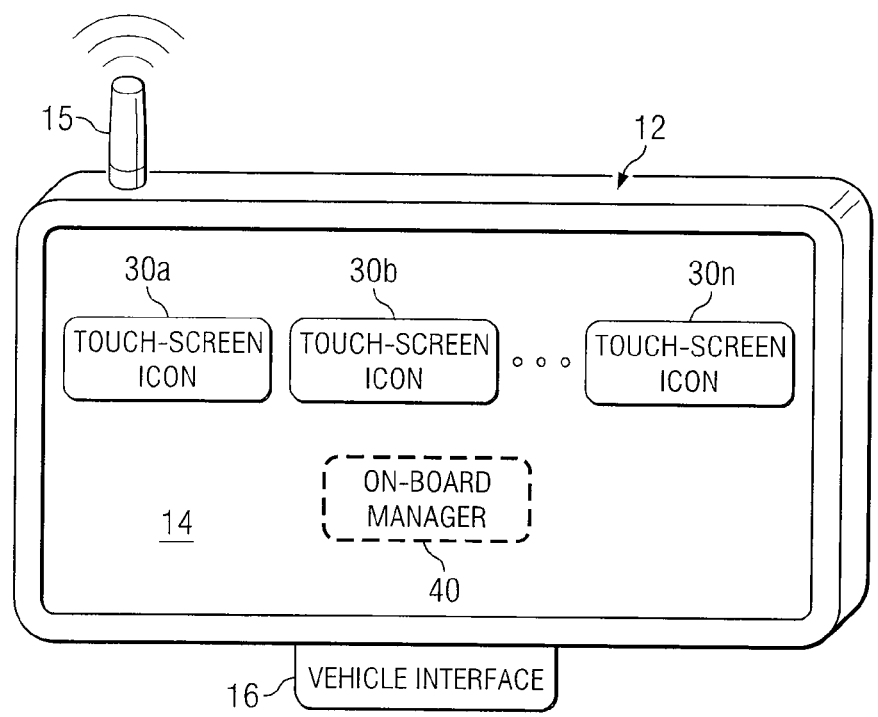
FIG. 2 illustrates an example on-board vehicle computer system.

FIG. 2 illustrates an example on-board vehicle computer system 12. In particular embodiments, on-board vehicle computer system 12 includes display 14, wireless interface 15, vehicle interface 16, touch-screen icons 30, and an on-board manager 40. Display 14, wireless interface 15, and vehicle interface 16 are described above with reference to FIG. 1; thus, these components will not be described again.

Touch-screen icons 30 generally include graphical information displayed by display 14. For example, a user may select touch-screen icon 30 by pressing on display 14 in the general area of touch-screen icon 30. Touch-screen icons 30 may have any suitable appearance, shape, or size. As described in more detail below, touch-screen icons 30 may be associated with one or more vehicle features.

Touch-screen icon 30a may be associated with a virtual assistant. A virtual assistant may have one or more anthropomorphic characteristics and may interact with a user via at least display 14. For example, the virtual assistant may include a computer-simulated display of a human, such as a police officer, film star, or famous athlete. In particular embodiments, the computer-simulated display may be based on a digital photograph uploaded to on-board vehicle computer system 12 by a user. As another example, the virtual assistant may include an interactive cartoon character, such as an animal, car, or robot. As another example, the virtual assistant may include recorded audio and video. As another example, the virtual assistant may include streaming audio and video received from the Internet.

Display 14 may present the virtual assistant upon selection of touch-screen icon 30a. For example, the virtual assistant may provide directions, local business information, traffic reports, and vehicle status information. As another example, the virtual assistant may provide mechanical problem information. As another example, the virtual assistant may assist the user in setting up a vehicle service appointment. As another example, the virtual assistant may assist the user in unlocking the vehicle. In particular embodiments, the virtual assistant may be voice-activated and may respond to the voice of the user. In particular embodiments, the virtual assistant may include any suitable interactive voice response (IVR) interface. The virtual assistant may have any suitable style (e.g., male or female) and sound (e.g., voice or language). For example, a user may configure the style and sound of the virtual assistant. As another example, the vehicle manufacturer may configure the style and sound of the virtual assistant to match the manufacturer's brand.

Touch-screen icon 30b may be associated with one or more RFID system settings associated with one or more RFID tags in a personal item of the user. For example, a vehicle key may include an RFID tag. An RFID reader in the vehicle communicates with the RFID tag to determine one or more RFID system settings associated with the RFID tag to identify the user. In the example, the RFID system settings may enable on-board vehicle computer system 12 to determine whether to start the vehicle engine based on the RFID tag. As another example, the one or more RFID system settings may include user rules such as a vehicle speed limit, an audio volume limit, and a geographic area limit.

Touch-screen icon 30n may be associated with one or more vehicle settings. The one or more vehicle settings may include one or more climate control settings, audio settings, ergonomic settings, and any other future settings such as vehicle color settings, as examples. In particular embodiments, a user may configure the vehicle settings through input provided by the user through display 14. In particular embodiments, on-board vehicle computer system 12 may configure the vehicle settings according to one or more RFID system settings associated with one or more RFID tags.

On-board manager 40 may refer to any suitable hardware, software, or embedded logic component or a combination of two or more such components embodied in one or more tangible media for execution, that when executed manages configuring and displaying one or more vehicle features on display 14. For example, on-board manager 40 may manage configuring and displaying vehicle features through touch-screen icons 30. In the example, when a user selects touch-screen icon 30, on-board manager 40 may generate the vehicle feature data for the vehicle feature associated with the selected touch-screen icon 30. The vehicle feature data may display the vehicle feature and the user may input information to configure the vehicle feature.

In particular embodiments, on-board manager 40 may reside in a storage device of computer system, such as memory. The memory may connect to display 14 and vehicle interface 16, and on-board manager 40 may communicate with display 14 and vehicle interface 16. In particular embodiments, on-board manager 40 may reside in any other suitable device. Additional details of embodiments of on-board manager 40 are described below with reference to FIG. 3.

On-board vehicle computer system 12 may include a battery (not illustrated) to provide power. In particular embodiments, the battery may be a rechargeable battery. One or more electrical outlets, such as cigarette lighter outlets or similar electrical interfaces, may also connect to on-board vehicle computer system 12 (e.g., through vehicle interface 16) to provide power. However, numerous other devices may connect to on-board vehicle computer system 12 to provide power.

A component of on-board vehicle computer system 12 may include any suitable arrangement of elements, for example, an interface, logic, memory, other suitable element, or a combination of any of the preceding. An interface receives input, sends output, processes the input and output, performs other suitable operation, or performs a combination of any of the preceding. Logic performs the operations of the component, for example, by executing instructions to generate output from input. Logic may include hardware, software, or embedded logic component or a combination of two or more such components, where appropriate, according to particular needs. Certain logic, such as a processor, may manage the operation of a component. Examples of a processor include one or more computers, one or more microprocessors, one or more applications, other logic, or a combination of any of the preceding.

A memory stores information. A memory may comprise computer memory (e.g., Random Access Memory (RAM) or Read Only Memory (ROM)), mass storage media (e.g., a hard disk), removable storage media (e.g., a Compact Disk (CD) or a Digital Video Disk (DVD)), database, network storage (e.g., a server), other computer-readable medium, or a combination of any of the preceding.

Figure 3:
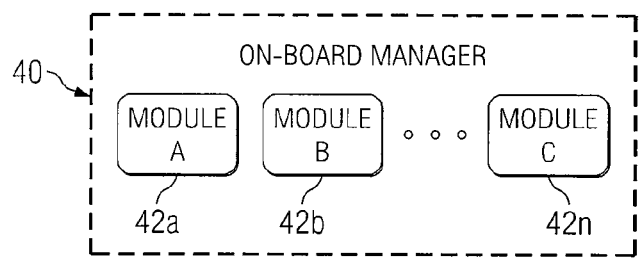
FIG. 3 illustrates an example on-board manager of the on-board vehicle computer system of FIG. 2.

FIG. 3 illustrates an example on-board manager 40 of on-board vehicle computer system 12 of FIG. 2. In particular embodiments, on-board manager 40 may include one or more modules 42 to perform one or more functions. In particular embodiments, on-board manager 40 includes module A 42a, module B 42b, and module N 42n. Module A 42a, module B 42b, and module N 42n may generate vehicle feature data to configure and display one or more vehicle features on a display. For example, module A 42a may generate vehicle feature data to configure and display one or more vehicle settings. As another example, module B 42b may generate vehicle feature data to configure and display one or more RFID system settings. As another example, module N 42n may generate vehicle feature data to configure and display a virtual assistant. In particular embodiments, each module 42 may be associated with a touch-screen icon 30 of FIG. 2. In particular embodiments, modules 42 may execute concurrently. In particular embodiments, modules 42 may execute in a particular order. In particular embodiments, on-board manager 40 may combine vehicle feature data generated by a first module 42 with vehicle feature data generated by a second module 42. However, the present disclosure contemplates many types of modules. Various embodiments may include, some, all, or none of the enumerated modules.

Figure 4:
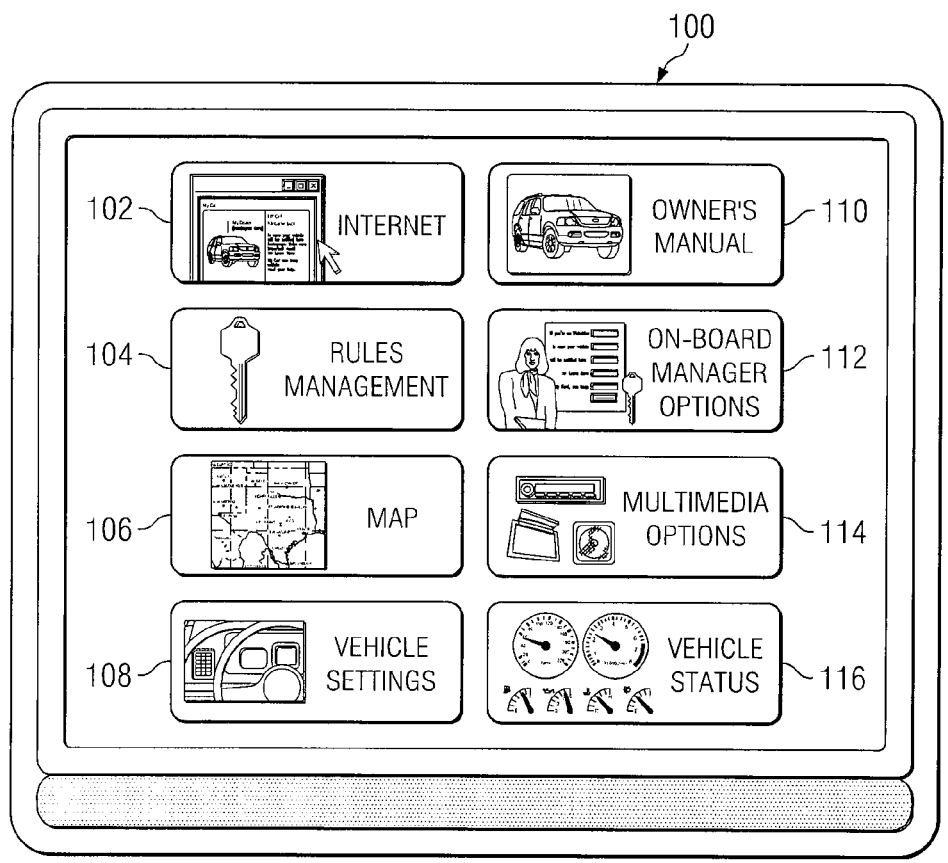
FIG. 4 illustrates an example vehicle feature screen of the on-board vehicle computer system of FIG. 2.

FIG. 4 illustrates an example vehicle feature screen 100 of on-board vehicle computer system 12 of FIG. 2. In particular embodiments, screen 100 includes various icons such as internet icon 102, rules management icon 104, map icon 106, vehicle settings icon 108, owner's manual icon 110, on-board manager options icon 112, multimedia options icon 114, and vehicle status icon 116. Each of the icons in screen 100 may be associated with one or more modules to perform one or more functions, as described above with reference to FIG. 3.

In particular embodiments, a user may select internet icon 102 to configure and display a browser. For example, on-board vehicle computer system 12 of FIG. 2 may access a network such as the Internet. In the example, the user may select internet icon 102 to display an Internet browser screen. The browser screen may display, for example, a web page associated with the vehicle. As another example, the user may select internet icon 102 to configure network settings. As another example, the user may select internet icon 102 to display e-mail for the user.

In particular embodiments, a user may select rules management icon 104 to configure and display one or more RFID system settings associated with one or more RFID tags. For example, an RFID reader in the vehicle may communicate with an RFID tag (e.g., in a vehicle key) to determine one or more RFID system settings associated with the RFID tag. The RFID system settings may include certain user rules associated with the RFID tag. For example, user rules may include a vehicle speed limit, an audio volume limit, and a geographic area limit for the RFID tag. In the example, the user may select rules management icon 104 to display and configure user rules associated with the RFID tag.

In particular embodiments, a user may select map icon 106 to configure and display a navigation system. For example, on-board vehicle computer system 12 may be GPS-enabled. As another example, the vehicle connected to on-board vehicle computer system 12 may include a GPS-enabled navigation system. The GPS information may identify the location of on-board vehicle computer system 12. On-board vehicle computer system 12 may generate a map with directions, local business information, and traffic reports, as examples. In particular embodiments, a user may disconnect on-board vehicle computer system 12 from a vehicle, and on-board vehicle computer system 12 may generate a map of the location where on-board vehicle computer system 12 is located. In particular embodiments, the user may select map icon 106 to configure the navigation system settings.

In particular embodiments, a user may select vehicle settings icon 108 to configure and display one or more vehicle settings. Vehicle settings may include one or more climate control settings, radio system settings, ergonomic settings, and any other future settings such as vehicle color settings, as examples. For example, a user may select vehicle settings icon 108 to set a desired temperature for the vehicle. As another example, the user may select vehicle settings 108 to modify the radio presets for the vehicle's audio system. As another example, the user may select vehicle settings icon 108 to configure a desired seat setting. As described above, on-board vehicle computer system 12 may configure and display RFID system settings. These RFID system settings may include one or more vehicle settings that are associated with a profile for a particular user. The user may configure these vehicle settings by selecting vehicle settings icon 108.

In particular embodiments, a user may select owner's manual icon 110 to configure and display an owner's manual of the vehicle. For example, the owner's manual may be an electronic owner's manual that includes multimedia vehicle instructions. In the example, if the vehicle if disabled by a flat tire, then the user may select owner's manual icon 110 to find the section in the electronic owner's manual regarding flat tires. The section in the electronic owner's manual may include a multimedia presentation of roadside assistance. In the example, the electronic owner's manual may play a video showing the user how to find the spare tire in the vehicle and how to find and use the vehicle jack to replace the flat tire. In particular embodiments, on-board vehicle computer system 12 may be detached from the vehicle, the user may place on-board vehicle computer system 12 next to the vehicle, and view the electronic owner's manual while fixing the flat tire.

In particular embodiments, a user may select on-board manager options icon 112 to configure and display one or more settings for on-board vehicle computer system 12. For example, a user may select on-board manager options icon 112 to configure the style of screen 100. As another example, the user may select on-board manager options 112 to configure the style and sound of the virtual assistant. In the example, the user may select the style and sound of the virtual assistant to match a desired style and sound. As another example, the user may select on-board manager options icon 112 to add a new RFID tag and configure the associated RFID system settings for the new RFID tag.

In particular embodiments, a user may select multimedia options icon 114 to configure and display multimedia data for playback. For example, the user may select multimedia options icon 114 to download audio or select stored audio files for playback on the vehicle's audio system. As another example, the user may select multimedia options icon 114 to download other multimedia data such as movies for playback. As another example, the user may select multimedia options icon 114 to synchronize the audio system's audio library with an audio library stored at the home of the user. As yet another example, the user may select multimedia options icon 114 to configure the vehicle's audio system.

In particular embodiments, a user may select vehicle status icon 116 to configure and display vehicle status data. For example, the user may select vehicle status icon 116 to display vehicle status data from an OBD system. As another example, the user may select vehicle status icon 116 to display gauges for the vehicle including a speed gauge, a battery gauge, a fuel gauge, and a thermometer gauge. As yet another example, the user may select vehicle status icon 116 to display service interval information for the vehicle and to arrange a vehicle's service appointment at a vehicle service center.

Figure 5:
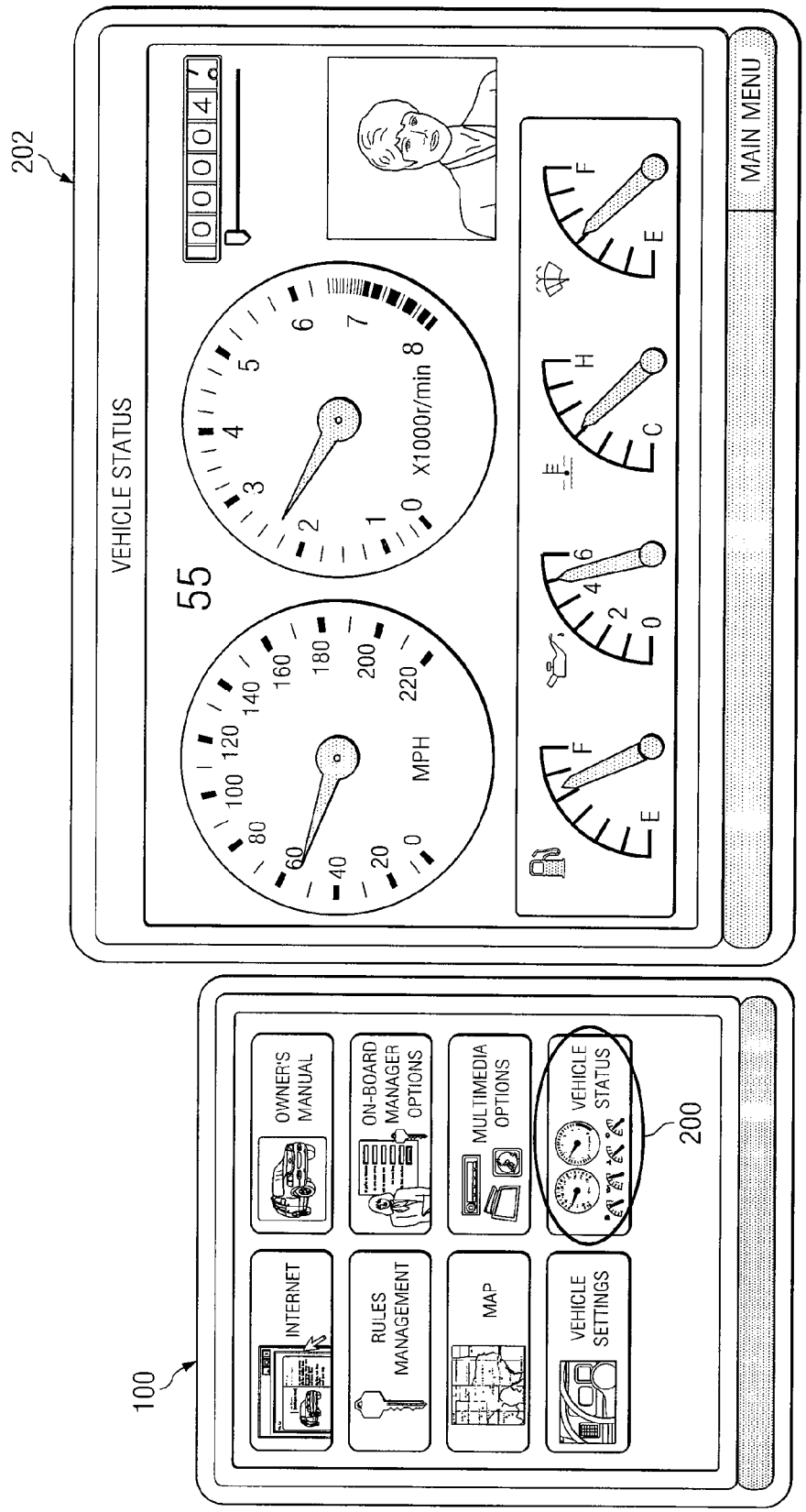
FIG. 5 illustrates an example status screen of the on-board vehicle computer system of FIG. 2.

FIG. 5 illustrates an example status screen 202 of on-board vehicle computer system 12 of FIG. 2. In particular embodiments, the user may select the vehicle status icon, as indicated by reference number 200, from screen 100 and on-board vehicle computer system 12 may display status screen 202. In FIG. 5, status screen 202 includes gauges such as a speed gauge, a tachometer gauge, a fuel gauge, an oil gauge, a temperature gauge, and a fluid gauge. Status screen 202 also includes a display of a virtual assistant. The virtual assistant may be voice-activated and may provide additional information to the user. For example, the virtual assistant may provide directions, local business information, traffic reports, and further vehicle status information. Status screen 202 also includes an odometer gauge.

Figure 6:
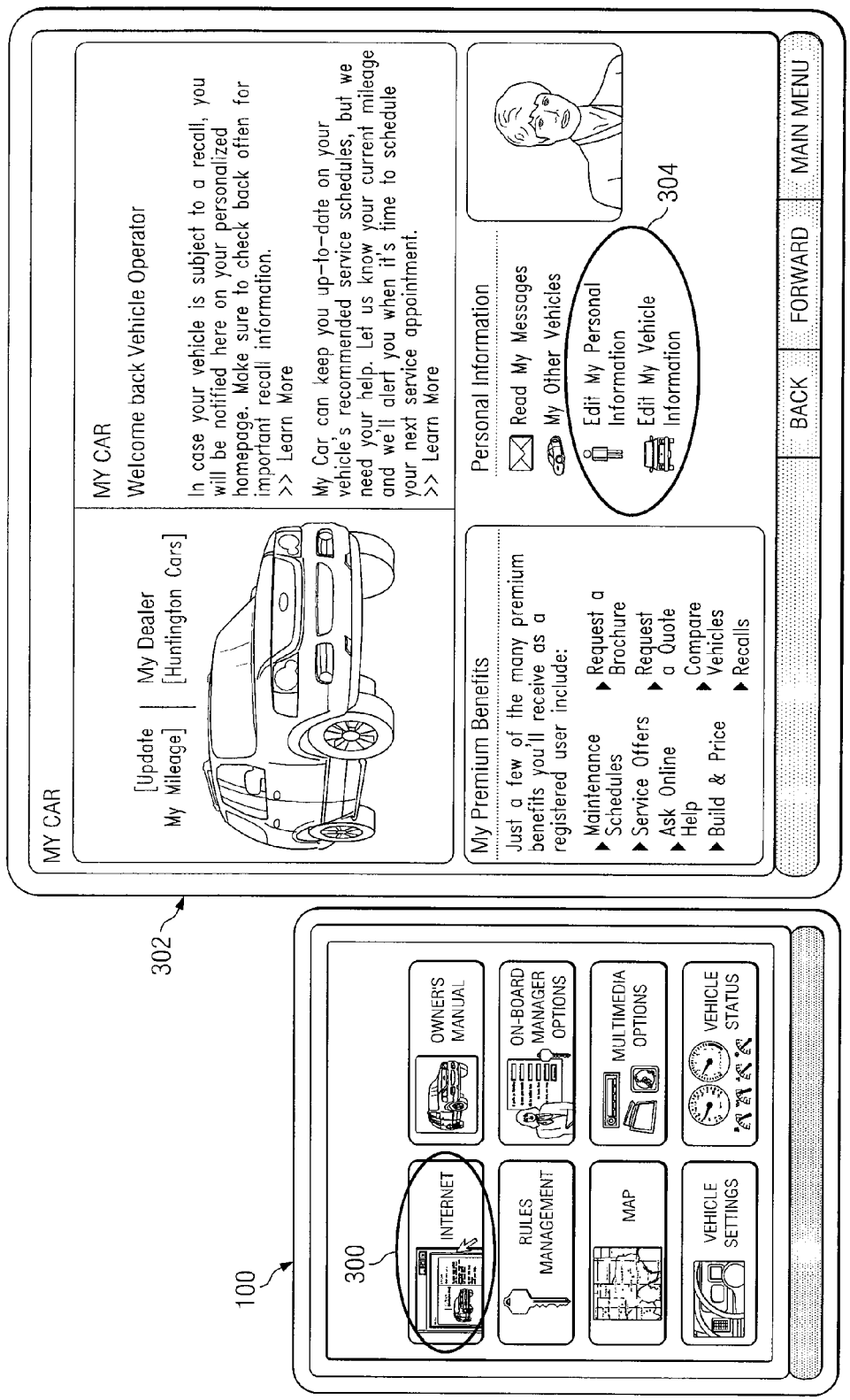
FIG. 6 illustrates an example internet screen of the on-board vehicle computer system of FIG. 2.

FIG. 6 illustrates an example internet screen 302 of on-board vehicle computer system 12. In particular embodiments, the user may select the internet icon, as indicated by reference number 300, and on-board vehicle computer system 12 may display internet screen 302. Internet screen 302 includes a website with vehicle information. For example, the website includes hyperlinks for maintenance schedules, service offers, and other information related to the vehicle. The website also includes recall information and personal information for the user. The user may select a hyperlink regarding the personal information as indicated by reference number 304 to read messages, access information related to other vehicles, edit personal information, or edit vehicle information.

Figure 7:
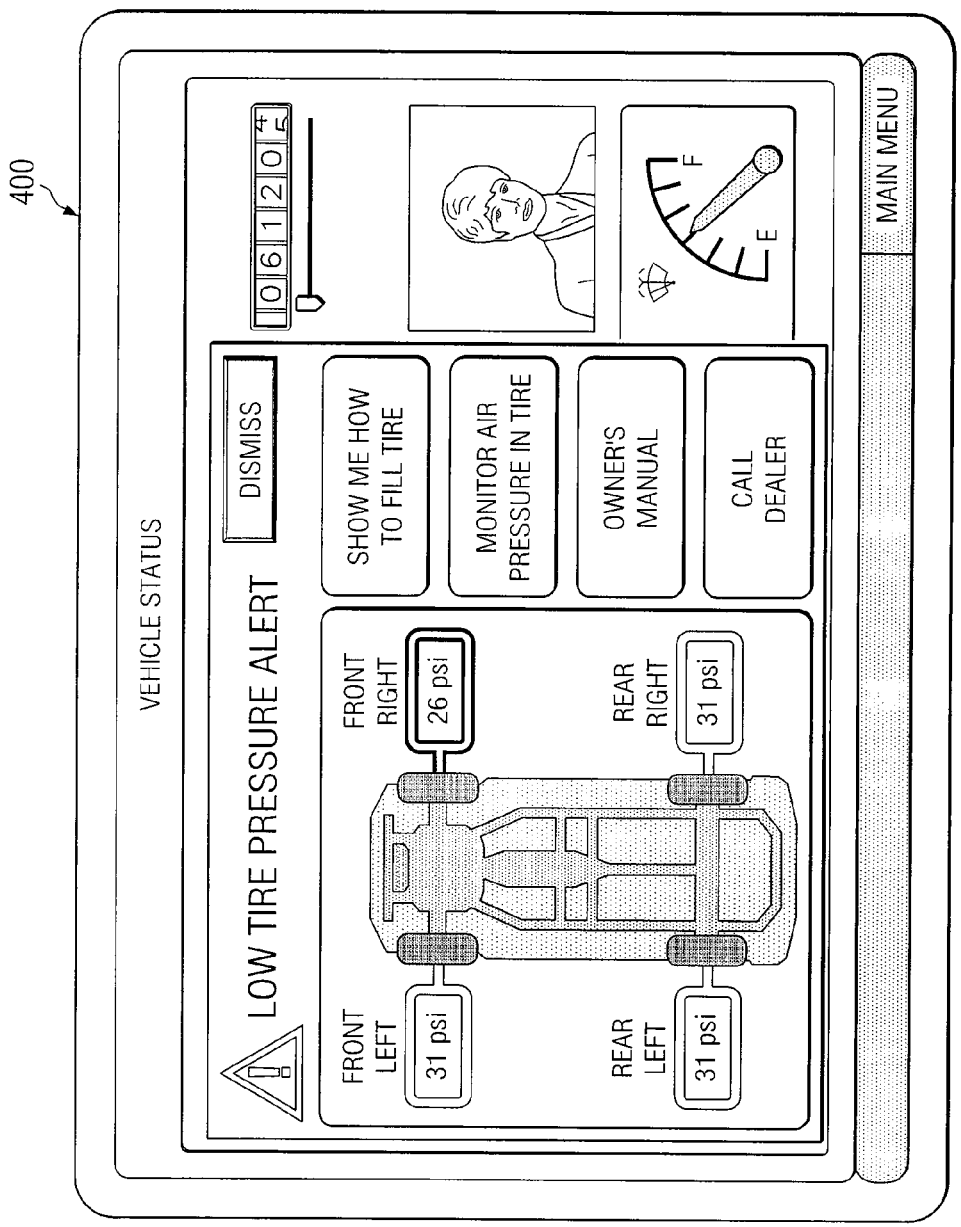
FIG. 7 illustrates an example tire pressure screen of the on-board vehicle computer system of FIG. 2.

FIG. 7 illustrates an example tire pressure screen 400 of on-board vehicle computer system 12 of FIG. 2. In particular embodiments, the virtual assistant may notify the user that one of the tires has a low pressure. In FIG. 7, the notification includes a low pressure tire alert message with a graphical depiction of the four tires of the vehicle and the corresponding tire pressures in pounds per square inch (psi). The low pressure tire alert may also include touch-screen icons associated with the low pressure tire alert message. In FIG. 7, the touch-screen icons include a show me how to fill tire icon, a monitor air pressure in tire icon, an owner's manual icon, and a call dealer icon.

Figure 8:
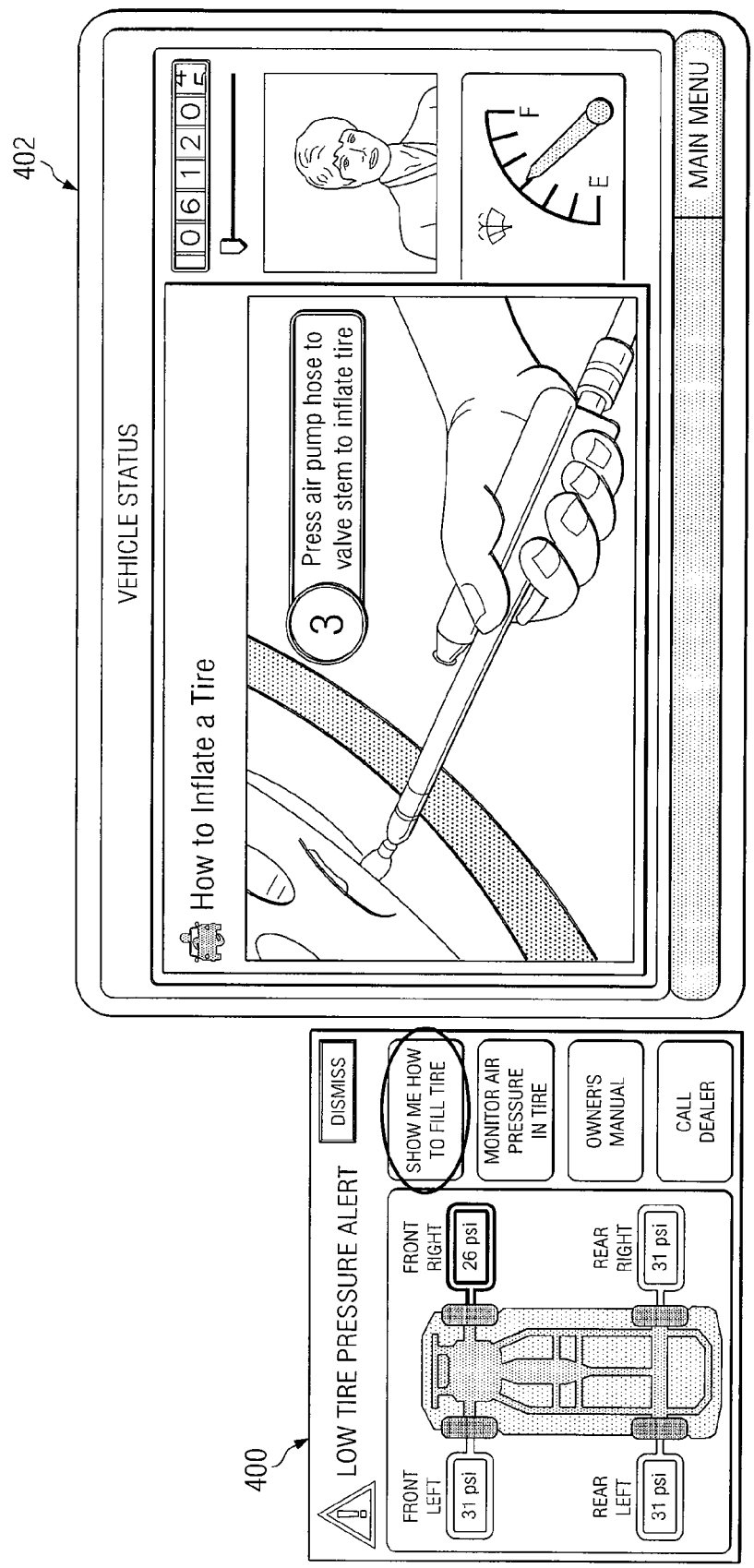
FIG. 8 illustrates an example tire inflation screen of the on-board vehicle computer system of FIG. 2.

FIG. 8 illustrates an example tire inflation screen 402 of on-board vehicle computer system 12. In particular embodiments, if the user selects the show me how to fill tire icon, on-board vehicle computer system 12 may display a demonstration on how to fill a tire (e.g., tire inflation screen 402). Tire inflation screen 402 may include a multimedia demonstration of how to inflate a tire.

Figure 9:
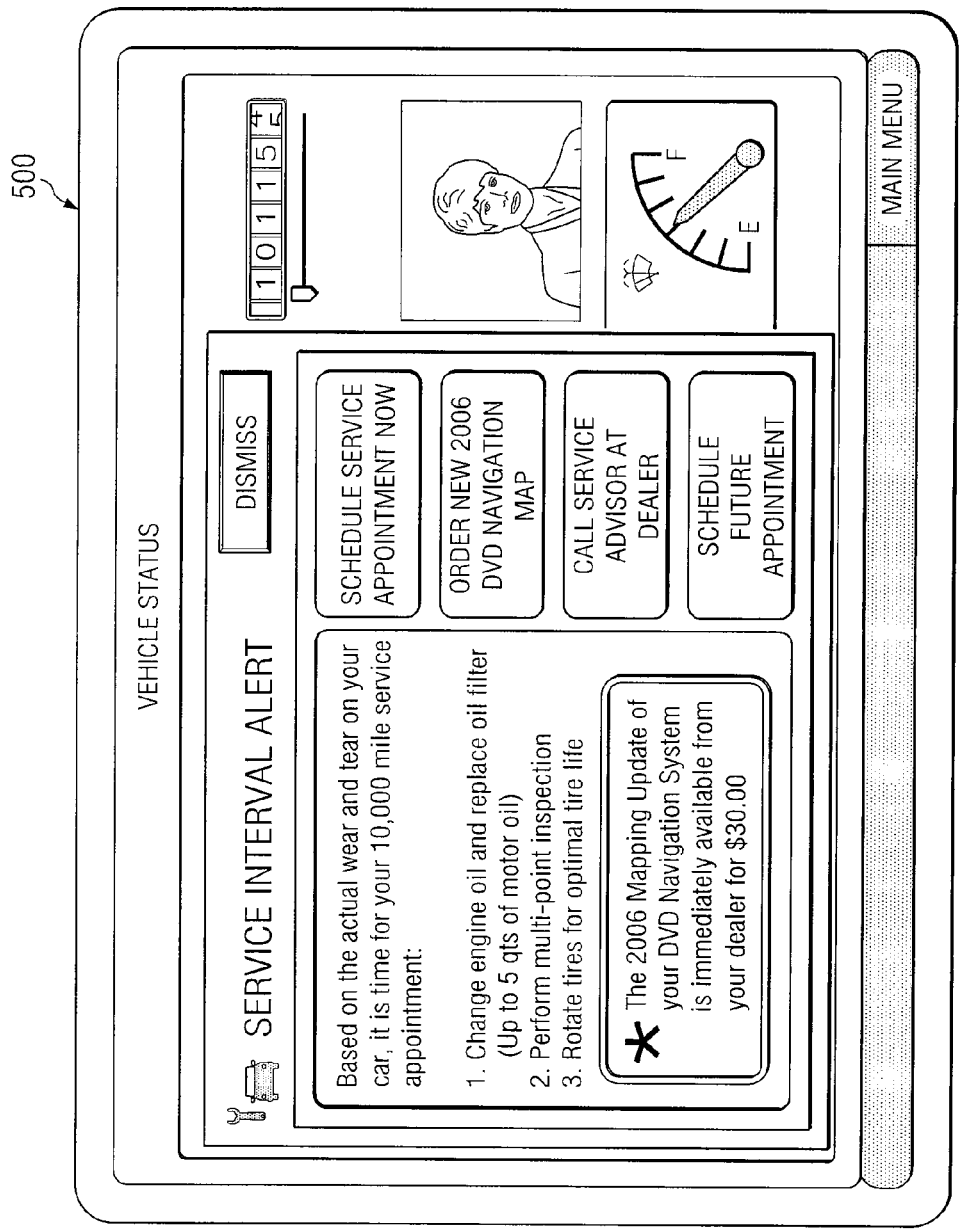
FIG. 9 illustrates an example service interval screen of the on-board vehicle computer system of FIG. 2.

FIG. 9 illustrates an example service interval screen 500 of on-board vehicle computer system 12. In particular embodiments, the virtual assistant notifies the user that the vehicle is within a service interval and it is due for a 10,000 mile service appointment. The vehicle service interval also includes a service description section including actions such as changing the engine oil, performing a multipoint inspection, and rotating tires for optimal tire life. The vehicle service interval also includes various touch-screen icons such as a schedule service appointment now icon, an order new 2006 DVD navigation map icon, a call service advisor at dealer icon, and a schedule future appointment icon.

Figure 10:
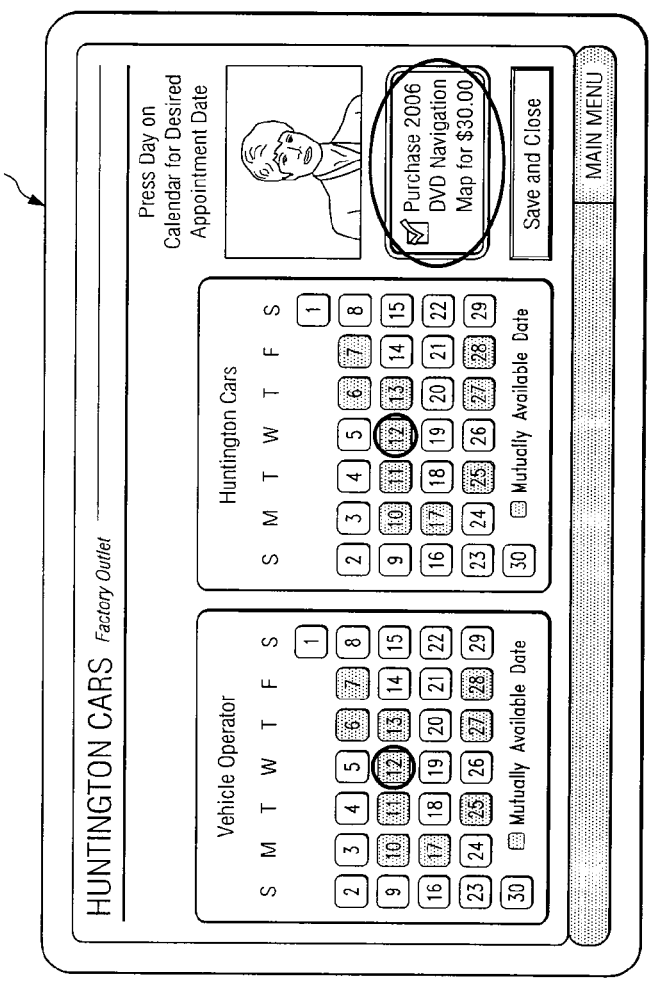
FIG. 10 illustrates an example service scheduling screen of the on-board vehicle computer system of FIG. 2.
Figure 10:
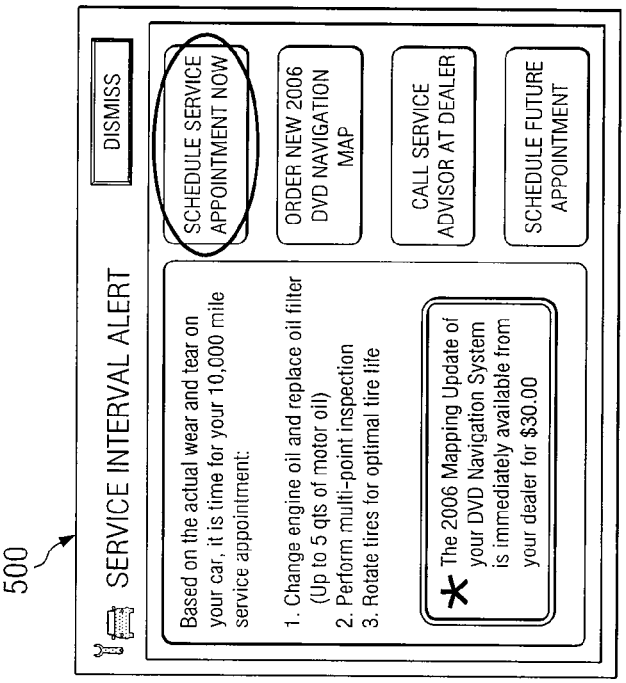

FIG. 10 illustrates an example service scheduling screen 502 of on-board vehicle computer system 12. In particular embodiments, the user selects the schedule service appointment now icon to schedule a service appointment and on-board vehicle computer system 12 may display service scheduling screen 502 to schedule the service appointment. In FIG. 10, service scheduling screen 502 includes a calendar display for the user and a calendar display for the service center in order to schedule a mutually available date. In addition, service scheduling screen 502 provides an option to purchase an updated navigation map in addition to scheduling a desired appointment date for the service.

Figure 11:
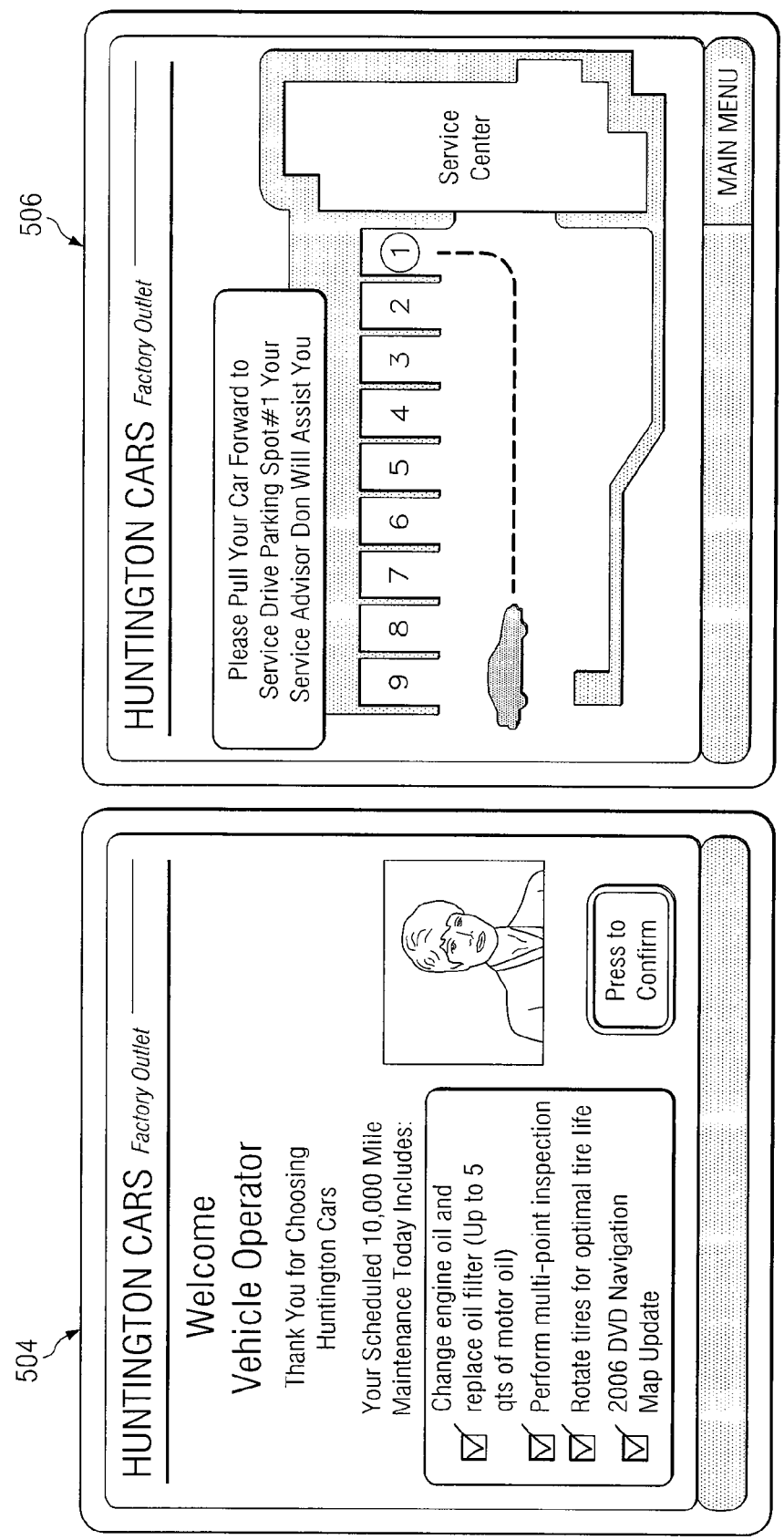
FIG. 11 illustrates example service instruction screens of the on-board vehicle computer system of FIG. 2.

FIG. 11 illustrates example service instruction screens 504 and 506 of on-board vehicle computer system 12. In particular embodiments, the user takes the vehicle to the service center for the scheduled service. Service instruction screen 504 provides a brief service description including actions such as changing the engine oil, performing multipoint inspection, rotating the tires for optimal tire life, and updating the navigation map. Service instruction screen 506 includes instructions for the user regarding where to park at the service center and information regarding the service advisor in charge of servicing the vehicle.

Figure 12:
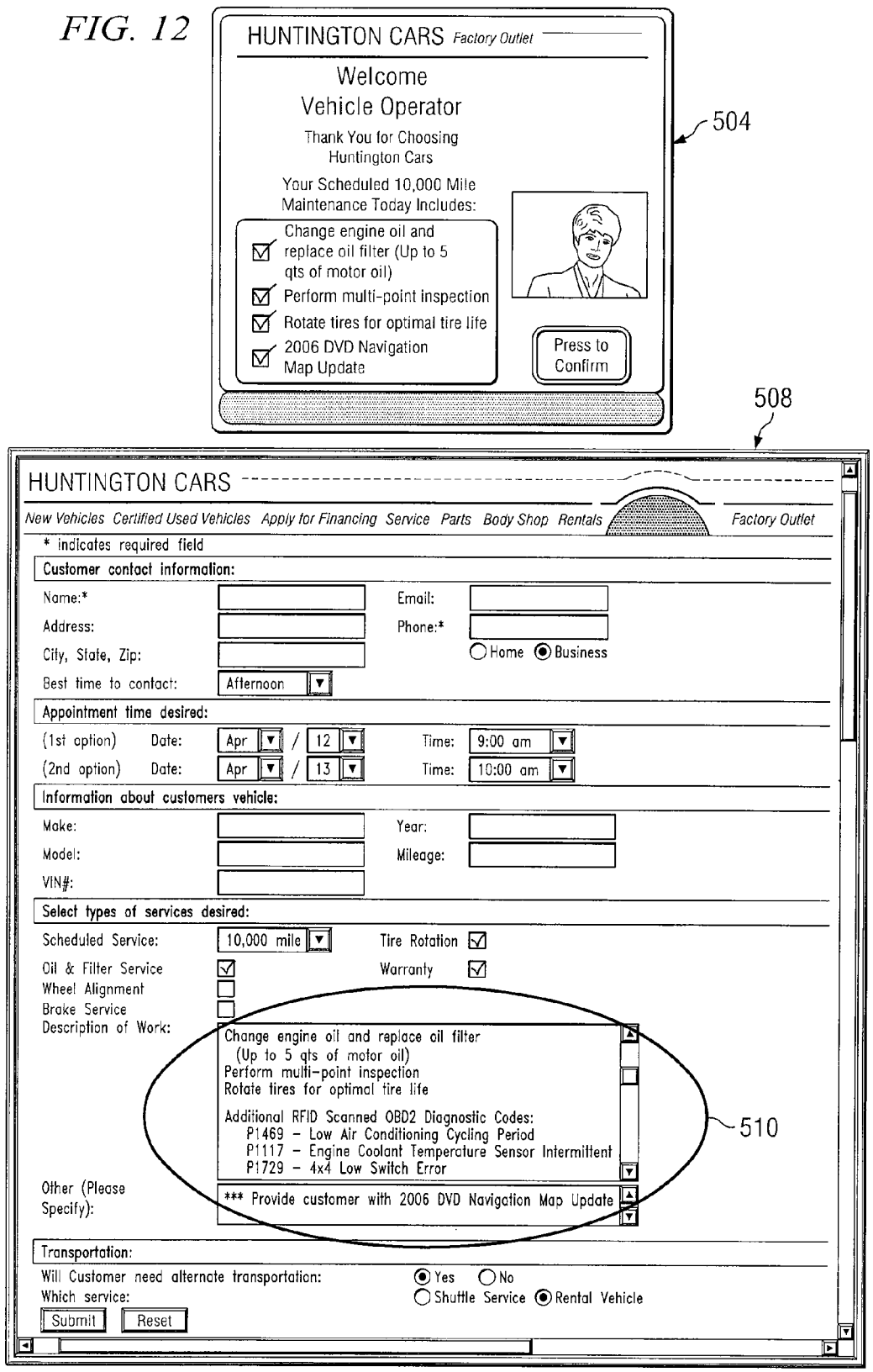
FIG. 12 illustrates an example service form screen of the on-board vehicle computer system of FIG. 2.

FIG. 12 illustrates an example service form screen 508 of on-board vehicle computer system 12. In particular embodiments, when the user takes the car to the service center for service, on-board vehicle computer system 12 may display service form screen 508 to provide further details regarding customer contact information, appointment time, and information regarding the vehicle, types of services desired, and an alternate mode of transportation during the vehicle service. In particular embodiments, on-board vehicle computer system 12 may input information into the fields in service form screen 508. In particular embodiments, on-board vehicle computer system 12 may upload all relevant information to the service center, and the service center may input information into the fields in service form screen 508. As indicated by reference number 510, service form screen 508 displays a detailed description of the service with additional diagnostic codes provided by the vehicle's OBD system.

Figure 13:
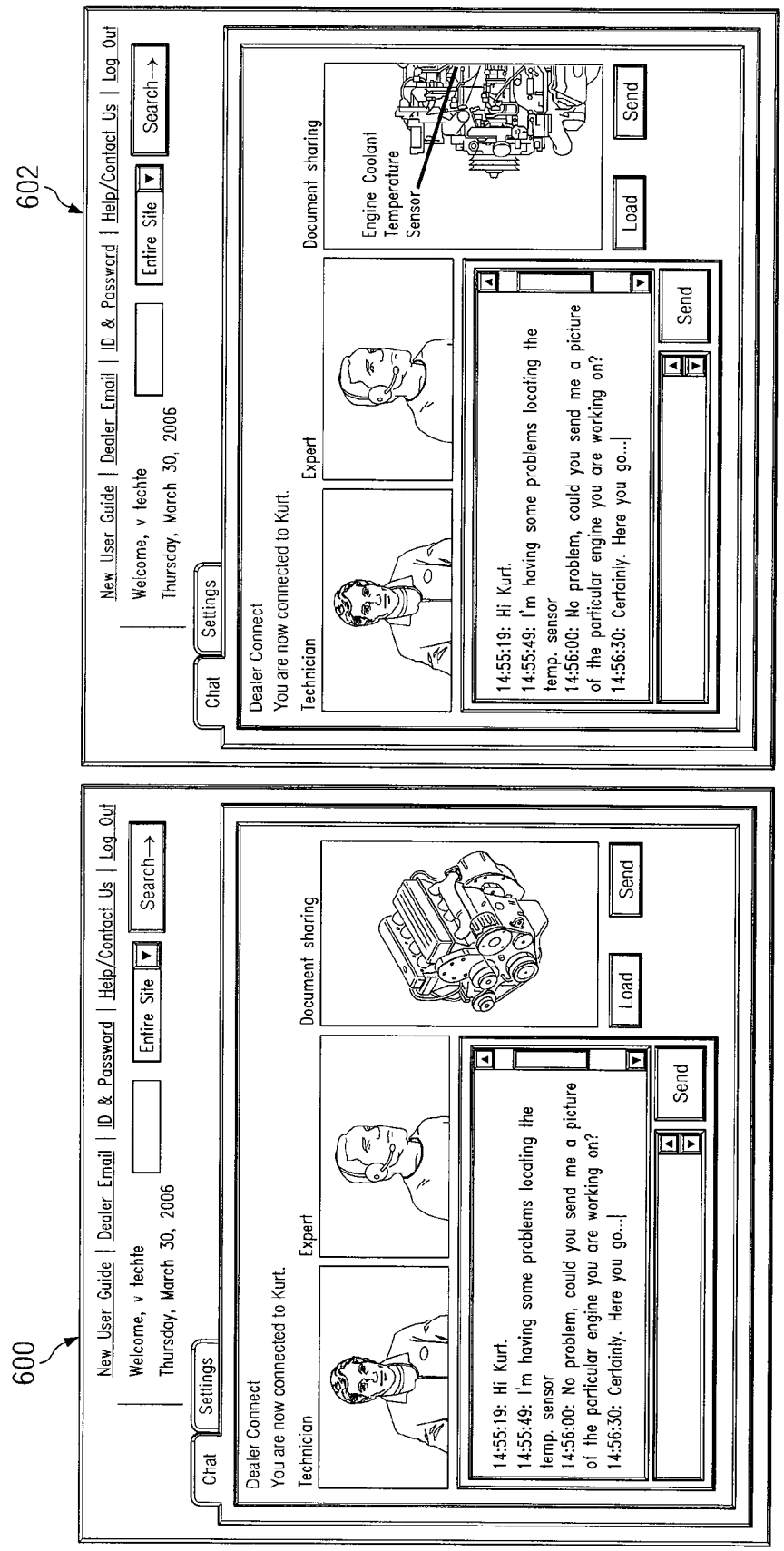
FIG. 13 illustrates example collaboration screens of the on-board vehicle computer system of FIG. 2.

FIG. 13 illustrates example service collaboration screens 600 and 602 of on-board vehicle computer system 12. In particular embodiments, during service at the service center, the service technician may communicate with a service expert through collaboration screens 600 and 602 that include a chat screen and a document-sharing screen. In particular embodiments, the vehicle service technician may ask questions to the vehicle service expert. As shown in service collaboration screen 602, the vehicle service expert may point to particular equipment in the vehicle through the document-sharing screen and may provide answers to questions posed by the vehicle service technician in the chat screen.

Figure 14:
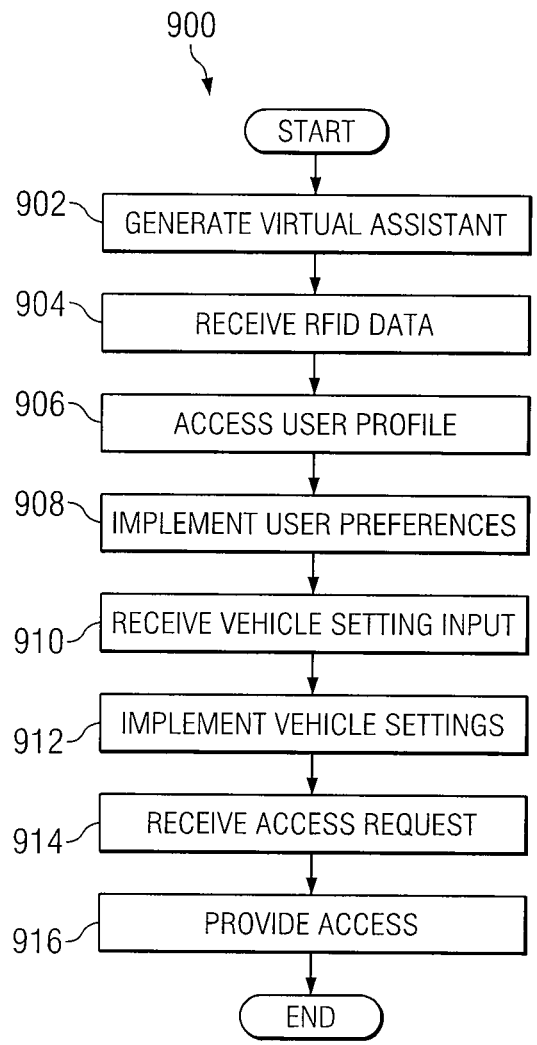
FIG. 14 illustrates an example method for displaying and configuring vehicle features.

FIG. 14 illustrates an example method 900 for displaying and configuring vehicle features. The method begins at step 902, where on-board vehicle computer system 12 generates a virtual assistant. The virtual assistant may have one or more anthropomorphic characteristics and may interact with a user to facilitate user access to one or more vehicle features. On-board vehicle computer system 12 automatically receives data from an RFID tag in a personal item of the user to identify the user at step 904. For example, a vehicle key may include an RFID tag. An RFID reader in the vehicle may communicate with the RFID tag to determine one or more RFID system settings associated with the RFID tag.

At step 906, on-board vehicle computer system 12 accesses a profile associated with the RFID tag. The profile may include one or more preferences of the user for one or more vehicle settings. In particular embodiments, the profile may include one or more preferences of the user for one or more vehicle settings. In particular embodiments, the profile may include one or more user rules such as a vehicle speed limit, an audio volume limit, and a geographic area limit. At step 908, on-board computer system 12 automatically implements one or more of the preferences of the user.

On-board vehicle computer system 12 receives input from a user to configure vehicle settings at step 910. For example, on-board vehicle computer system 12 may receive desired vehicle settings for the climate control system. As another example, on-board vehicle computer system 12 may receive desired vehicle settings for the audio system. On-board vehicle computer system 12 implements the desired vehicle settings at step 912.

On-board vehicle computer system 12 receives input from the user requesting access to one or more desired vehicle features at step 914. For example, display 14 may include one or more touch-screen icons that are associated with one or more vehicle features. A user may request access to a desired vehicle feature by selecting a particular touch-screen icon to display and configure the vehicle feature associated with the particular touch-screen icon. In response to the input, on-board vehicle computer system 12 provides the user access to one or more of the one or more desired vehicle features via at least display 14 at step 916.

Modifications, additions, or omissions may be made to the method without departing from the scope of the disclosure.

The method may include more, fewer, or other steps. Additionally, steps may be performed in any suitable order.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. An apparatus comprising:
   a touch-screen display;
   first logic encoded in one or more tangible media for execution and when executed operable to generate a virtual assistant for presentation to a user via the touch-screen display, the virtual assistant having one or more anthropomorphic characteristics and being operable to interact with the user via at least the touch-screen display to facilitate user access to one or more vehicle features;
   second logic encoded in one or more tangible media for execution and when executed operable to:
     automatically receive data from a radio-frequency identification (RFID) tag in a personal item of the user to identify the user;
     automatically access a profile associated with the RFID tag, the profile indicating one or more preferences of the user for one or more vehicle settings; and
     automatically initiate implementation of one or more of the preferences of the user indicated by the profile;
     wherein the profile associated with the RFID tag comprises one or more rules applicable to the user, the rules comprising one or more of a vehicle speed limit or a geographic area limit, and wherein modification of one or more of the rules requires a password;
   third logic encoded in one or more tangible media for execution and when executed operable to:
     receive input from the user indicating one or more preferences of the user for one or more vehicle settings and, in response to the input, initiate implementation of one or more of the preferences indicated by the user; and
     receive input from the user requesting access to one or more desired vehicle features and, in response to the input, provide the user access to one or more of the one or more desired vehicle features via at least the touch-screen display; and
   a vehicle interface operable to couple the apparatus to any of a plurality of vehicles and communicate data between the first, second, or third logic and the vehicle;
   wherein the touch-screen display and one or more of the first, second, or third logic are operable collectively to interact with the user independent of whether the vehicle interface is coupled to one of the plurality of vehicles,
   wherein at least one of the vehicle features uses one or more wireless communication links to provide functionality associated with the vehicle feature; and
   wherein the touch-screen display and one or more of the first, second, or third logic are operable collectively to interact with the user to facilitate access to one or more wireless-enabled vehicle features and implement one or more desired vehicle settings when the vehicle interface is physically disconnected and the apparatus is removed from the vehicle.

2. The apparatus of claim 1, further comprising fourth logic encoded in one or more tangible media for execution and when execute operable to provide interactive voice response (IVR) enabling voice communication between the user and one or more of the first logic, second logic, or third logic.

3. The apparatus of claim 1, wherein the one or more vehicle features comprise one or more of a navigation system, a multimedia owner manual for the vehicle, or a vehicle status feature.

4. The apparatus of claim 1, wherein the vehicle and the apparatus collectively provide each of one or more of the vehicle features.

5. The apparatus of claim 1, wherein at least one of the vehicle features uses Global Positioning System (GPS) to provide functionality associated with the vehicle feature.

6. The apparatus of claim 1, wherein one or more of the wireless communication links is an Institute of Electrical and Electronics Engineers (IEEE) 802.11 wireless local area network (WLAN) link.

7. The apparatus of claim 1, wherein the vehicle settings comprise one or more of one or more audio settings, one or more climate control settings, or one or more ergonomic settings.

8. The apparatus of claim 1, wherein the personal item comprises a key.

9. The apparatus of claim 1, wherein violation of one or more of the rules by the user automatically generates one or more notifications to one or more predetermined addresses.

10. The apparatus of claim 9, wherein one or more of the notifications to predetermined addresses each comprise a text message to a predetermined telephone number or an e-mail to a predetermined e-mail address.

11. A system comprising:
    a vehicle; and
    an on-board computer system operable to removably couple to the vehicle, the on-board computer system comprising:
    a touch-screen display;
    first logic encoded in one or more tangible media for execution and when executed operable to generate a virtual assistant for presentation to a user via the touch-screen display, the virtual assistant having one or more anthropomorphic characteristics and being operable to interact with the user via at least the touch-screen display to facilitate user access to one or more vehicle features;
    second logic encoded in one or more tangible media for execution and when executed operable to:
      automatically receive data from a radio-frequency identification (RFID) tag in a personal item of the user to identify the user;
      automatically access a profile associated with the RFID tag, the profile indicating one or more preferences of the user for one or more vehicle settings; and
      automatically initiate implementation of one or more of the preferences of the user indicated by the profile;
      wherein the profile associated with the RFID tag comprises one or more rules applicable to the user, the rules comprising one or more of a vehicle speed limit or a geographic area limit, and wherein modification of one or more of the rules requires a password;
    third logic encoded in one or more tangible media for execution and when executed operable to:
      receive input from the user indicating one or more preferences of the user for one or more vehicle settings and, in response to the input, initiate implementation of one or more of the preferences indicated by the user; and
      receive input from the user requesting access to one or more desired vehicle features and, in response to the input, provide the user access to one or more of the one or more desired vehicle features via at least the touch-screen display; and a vehicle interface operable to couple the on-board computer system to any of a plurality of vehicles and communicate data between the first, second, or third logic and the vehicle;

wherein the touch-screen display and one or more of the first, second, or third logic are operable collectively to interact with the user independent of whether the vehicle interface is coupled to one of the plurality of vehicles, wherein at least one of the vehicle features uses one or more wireless communication links to provide functionality associated with the vehicle feature; and wherein the touch-screen display and one or more of the first, second, or third logic are operable collectively to interact with the user to facilitate access to one or more wireless-enabled vehicle features and implement one or more desired vehicle settings when the vehicle interface is physically disconnected and the on-board computer system is removed from the vehicle.

12. The system of claim 11, wherein the vehicle comprises a car.

13. The system of claim 11, wherein the on-board computer system further comprises fourth logic encoded in one or more tangible media for execution and when execute operable to provide interactive voice response (IVR) enabling voice communication between the user and one or more of the first logic, second logic, or third logic.

14. The system of claim 11, wherein the one or more vehicle features comprise one or more of a navigation system, a multimedia owner manual for the vehicle, or a vehicle status feature.

15. The system of claim 11, wherein the vehicle and the on-board computer system collectively provide each of one or more of the vehicle features.

16. The system of claim 11, wherein at least one of the vehicle features uses Global Positioning System (GPS) to provide functionality associated with the vehicle feature.

17. The system of claim 11, wherein one or more of the wireless communication links is an Institute of Electrical and Electronics Engineers (IEEE) 802.11 wireless local area network (WLAN) link.

18. The system of claim 11, wherein the vehicle settings comprise one or more of one or more audio settings, one or more climate control settings, or one or more ergonomic settings.

19. The system of claim 11, wherein the personal item comprises a key.

20. The system of claim 11, wherein violation of one or more of the rules by the user automatically generates one or more notifications to one or more predetermined addresses.

21. The system of claim 20, wherein one or more of the notifications to predetermined addresses each comprise a text message to a predetermined telephone number or an e-mail to a predetermined e-mail address.

22. An apparatus comprising:
a touch-screen display;
first logic encoded in one or more tangible media for execution and when executed operable to generate a virtual assistant for presentation to a user via the touch-screen display, the virtual assistant having one or more anthropomorphic characteristics and being operable to interact with the user via at least the touch-screen display to facilitate user access to one or more vehicle features; and
second logic encoded in one or more tangible media for execution and when executed operable to:
automatically receive data from a radio-frequency identification (RFID) tag in a personal item of the user to identify the user;
automatically access a profile associated with the RFID tag, the profile indicating one or more preferences of the user for one or more vehicle settings; and
automatically initiate implementation of one or more of the preferences of the user indicated by the profile;
wherein the profile associated with the RFID tag comprises one or more rules applicable to the user, the rules comprising one or more of a vehicle speed limit or a geographic area limit, and wherein modification of one or more of the rules requires a password; and
a vehicle interface operable to couple the apparatus to any of a plurality of vehicles and communicate data between the first or second logic and the vehicle;
wherein the touch-screen display and one or more of the first or second logic are operable collectively to interact with the user independent of whether the vehicle interface is coupled to one of the plurality of vehicles,
wherein at least one of the vehicle features uses one or more wireless communication links to provide functionality associated with the vehicle feature; and
wherein the touch-screen display and one or more of the first, or second logic are operable collectively to interact with the user to facilitate access to one or more wireless-enabled vehicle features and implement one or more desired vehicle settings when the vehicle interface is physically disconnected and the apparatus is removed from the vehicle.

* * * * *